Sept. 19, 1933. G. C. CHRISTY 1,927,333
LUBRICATING DEVICE FOR LOCOMOTIVE JOURNAL BOXES
Filed Nov. 21, 1930 2 Sheets-Sheet 1
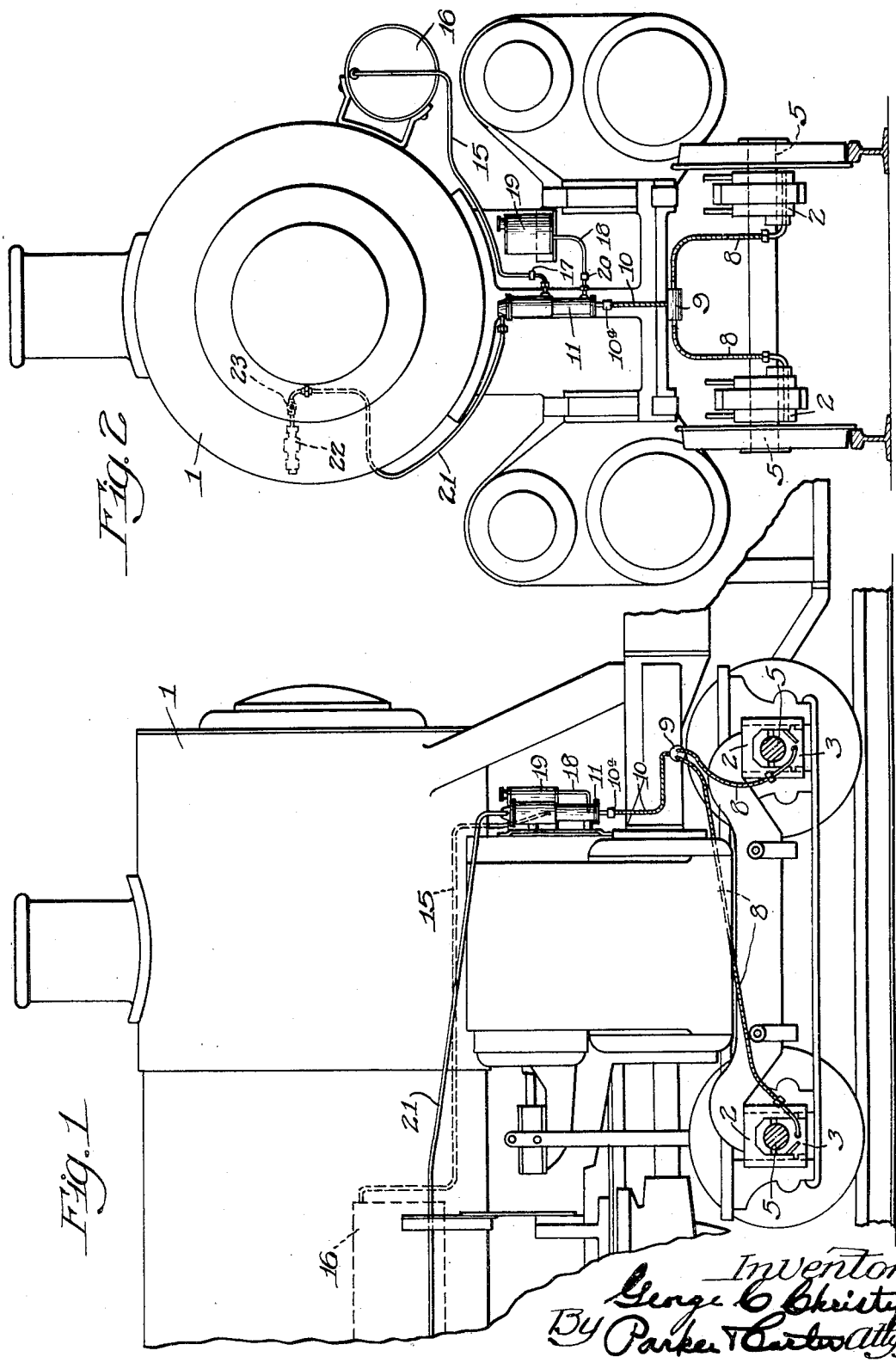

Sept. 19, 1933.                G. C. CHRISTY                1,927,333
              LUBRICATING DEVICE FOR LOCOMOTIVE JOURNAL BOXES
                  Filed Nov. 21, 1930           2 Sheets-Sheet 2
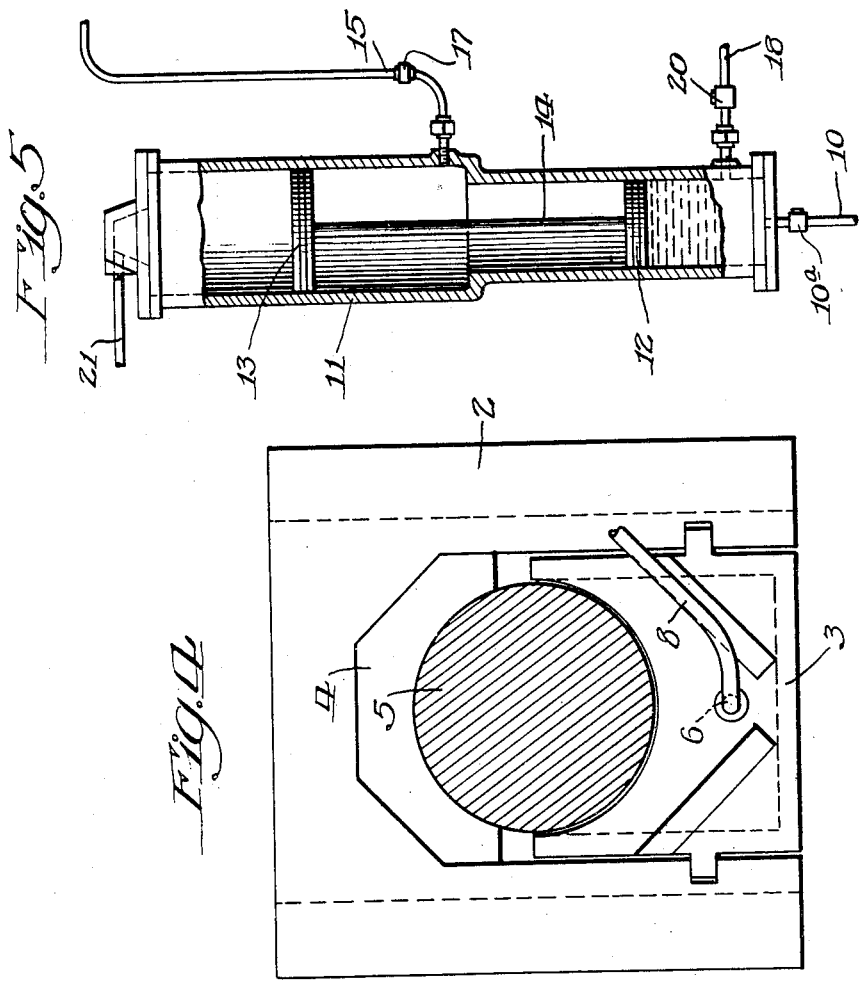
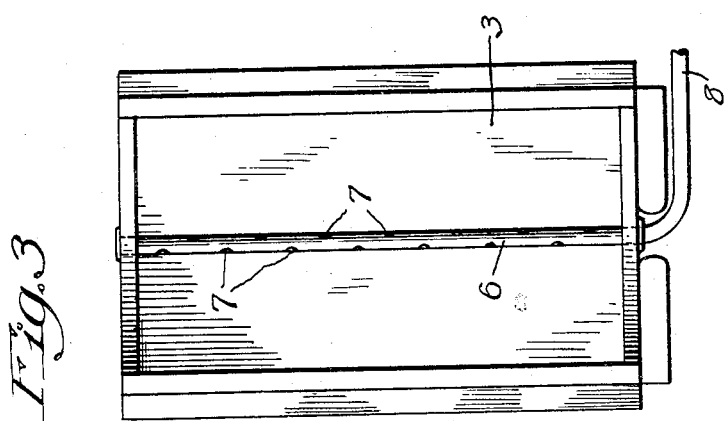

Patented Sept. 19, 1933

1,927,333

UNITED STATES PATENT OFFICE 1,927,333

LUBRICATING DEVICE FOR LOCOMOTIVE JOURNAL BOXES

George C. Christy, Chicago, Ill.

Application November 21, 1930
Serial No. 497,168

5 Claims. (Cl. 184—7)

This invention relates to lubricating devices for locomotive journal boxes and has for its object to provide a new and improved device of this description.

The invention has as a further object to provide a journal box lubricating system wherein the proper lubrication of the journals is insured.

The invention has as a further object to provide a system of this description whereby a uniform distribution of the lubricant is secured by means of the use of air.

The invention has as a further object to provide a lubricating system wherein the lubricant will be distributed to a plurality of journal boxes in measured quantities and waste of lubricant thereby prevented.

The invention has further objects which are more particularly pointed out in the accompanying description.

Referring now to the drawings:

Fig. 1 is a view showing the front end of a locomotive with one form of lubricating system embodying the invention installed thereon.

Fig. 2 is a front view of the locomotive shown in Fig. 1.

Fig. 3 is an enlarged view showing one of the cellars and the connection of the lubricating system therewith.

Fig. 4 is an enlarged view showing one of the journal boxes.

Fig. 5 is an enlarged side elevation of the oil controlling cylinder broken away to show the interior.

Like numerals refer to like parts through the several figures.

Referring now to the drawings, I have shown a locomotive 1 with the journal boxes for the journals. Each journal box consists of the body box 2 with the cellar 3 slidably engaged therewith and the journal bearing 4 resting on the journal 5. The cellar 3 is filled with some suitable lubricant holding material such as waste, this waste making contact with the journal 5.

Located in each cellar is a nozzle pipe 6 provided with a series of discharge perforations 7 through which the oil or lubricant passes so as to lubricate the waste in the cellar 3. These perforations are arranged in location and in size to produce an even volume ejection of the lubricant over the whole waste layer field in the cellar. I prefer to have these perforations varying in cross sectional area, the ones near the end of the nozzle pipe being greater in cross sectional area than those farther away from the end thereof, that is to say the perforations become larger as their distance from the source of oil supply increases.

Each of the nozzle pipes 6 is connected by a conduit 8 with a distributor 9, which consists of a receptacle into which the lubricant is received. This distributor 9 is connected by a conduit 10 with the discharge end of a cylinder 11. There is preferably a check valve 10a in this conduit. The cylinder 11 is provided with two pistons 12 and 13 connected together by the rod 14. The upper piston 13 is preferably the larger in diameter than the lower piston 12.

Leading from the middle portion of the cylinder between the pistons 12 and 13 is a conduit 15 which connects with an air reservoir 16 properly supported upon the locomotive. This conduit is provided with a check valve 17 which prevents reverse movement of the air from the cylinder toward the reservoir 16. The lower part of the cylinder 11 is provided with a conduit 18 which connects with an oil reservoir 19 mounted on the locomotive. A check valve 20 is located in this conduit to prevent reverse movement of the oil from the cylinder toward the oil reservoir.

Connected with the upper end of the cylinder 11 is a conduit 21 which connects with a source of air supply 22 on the locomotive. This connection is preferably what is termed the air turret located in the cab of the locomotive. A 3-way valve 23 controls the air from the source of air supply 22 and is located so as to be accessible for operation by the engineer of the locomotive. By means of this construction the lubricant is forced under pressure for equal distribution to the journal boxes and is preferably distributed through the cellar of each journal box and through the lubricating element therein, such as the waste, so as to thereby insure the proper lubrication of the journals under all conditions, the device being under the control of the engineer of the locomotive so that it can be operated by him easily and without effort.

I have described in detail a particular construction embodying the invention, but it is of course evident that the parts may be varied in many particulars without department from the spirit of the invention as embodied in the claims hereto appended, and I therefore do not limit myself to the particular construction shown.

The use and operation of my invention are as follows:

When the device is installed, as shown, and the oil reservoir 19 filled with oil, air in the air reservoir 16, through the agency of the conduit 15, enters the space of the cylinder 11 between the pistons 12 and 13. The 3-way valve 23 in the cab is kept in release position so as to permit admission of air through the conduit 21 into the upper part of the cylinder 11 so as to counteract or balance the air between the pistons, thus causing the pistons to be suspended in their upper stroke and position.

Oil from the oil reservoir 19 passes into the cylinder 11 below the piston 12. When it is desired to force this oil into the journal box, the 3-way valve is moved to force air into the upper end of the cylinder 11 above the piston 13. This forces the pistons 13 and 12 downwardly and forces oil out of the cylinder 11 through the conduit 10 into the distributor 9. The oil passes from the distributor through the conduit 8 into the nozzle pipes 6 and out through the nozzle perforations 7 into the waste in the cellar 3 of each journal box. When the proper amount of oil is injected into each cellar, the 3-way valve is moved so that the air between the pistons 12 and 13 from the reservoir 16 will lift the pistons and cause another charge of oil from the oil reservoir 19 to pass into the cylinder below the piston 12. The difference in diameter of the pistons 12 and 13 insures these pistons being moved to the proper position to secure this result.

I claim:

1. A lubricating device for locomotive journal boxes containing waste comprising a nozzle pipe located in each journal box, an oil distributor, a connection between the oil distributor and each of said nozzle pipes, and means controlled from the locomotive cab for injecting oil under pressure into said journal box through said nozzle to forcibly distribute the oil through the waste so as to insure the proper lubrication of the journals.

2. A lubricating device for locomotive journal boxes comprising a nozzle pipe located in each journal box, an oil distributor, a connection between the oil distributor and each of said nozzle pipes, a cylinder, an oil reservoir, a connection between said oil reservoir and the bottom of the cylinder, two pistons in said cylinder, an air reservoir, a connection between said air reservoir and the cylinder between said pistons, a source of air supply and a connection between the upper end of said cylinder and said source of air supply.

3. A lubricating device for locomotive journal boxes comprising a nozzle pipe located in each journal box, an oil distributor, a connection between the oil distributor and each of said nozzle pipes, a cylinder, an oil reservoir, a connection between said oil reservoir and the bottom of the cylinder, two pistons in said cylinder, an air reservoir, a connection between said air reservoir and the cylinder between said pistons, a source of air supply and a connection between the upper end of said cylinder and said source of air supply, and a controlling device for said source of air supply in the engine cab within convenient reach of the engineer.

4. A lubricating device for locomotive journal boxes containing waste comprising a nozzle pipe located in each journal box, a source of oil supply, a connection between each nozzle pipe and said source of oil supply, and air operated means for simultaneously injecting oil into said journal boxes under pressure to forcibly distribute the oil throughout the waste.

5. A lubricating device for locomotive journal boxes containing waste comprising a nozzle pipe located in each journal box, a source of oil supply, a connection between each nozzle pipe and said source of oil supply, and means for securing an equal distribution of the lubricant to each of said nozzle pipes, comprising a distributing device intermediate the source of oil supply and the nozzle pipes and a source of air supply controlled from the cab of the locomotive and a piston and cylinder for utilizing the air to forcibly inject oil through said nozzle pipes into said journal boxes and distribute it throughout said waste.

GEORGE C. CHRISTY.